Dec. 22, 1970 M. CAMRAS 3,550,149

MAGNETIC IMAGE PRINTING SYSTEM

Filed April 6, 1967 2 Sheets-Sheet 1

INVENTOR.
MARVIN CAMRAS

BY Hill, Sherman, Meroni, Gross & Simpson ATTORNEYS

INVENTOR.
MARVIN CAMRAS

BY Hill, Sherman, Meroni, Gross & Simpson
ATTORNEYS

United States Patent Office 3,550,149

Patented Dec. 22, 1970

3,550,149

MAGNETIC IMAGE PRINTING SYSTEM

Marvin Camras, Glencoe, Ill., assignor to IIT Research Institute, Chicago, Ill., a corporation of Illinois Filed Apr. 6, 1967, Ser. No. 628,964

The portion of the term of the patent subsequent to May 7, 1985, has been disclaimed Int. Cl. G01d *15/12;* G11b *5/20;* H04p *1/28*

U.S. Cl. 346—74 4 Claims

ABSTRACT OF THE DISCLOSURE

In the illustrated embodiment, core units are sequentially switched by applying first magnetomotive forces of alternating polarity and of generally rectangular waveform and second magnetomotive forces of alternating polarity and of substantially symmetrical generally triangular waveform to saturable magnetic material of the respective core units, and coordinating the frequencies, phases and amplitudes of the magnetomotive forces to provide substantially uniform time intervals between activation of the successive core units, particularly for the purpose of producing a magnetic image on a magnetizable record medium which may then be utilized to produce multiple "hard" copies of the recorded image. A special excitation waveform is also shown for precise timing of the switching of the individual core units.

BACKGROUND OF THE INVENTION

In the computer field, for example, an important problem is to provide output from the computer in the most usable and convenient form. In this case, one or multiple hard copies of such material should be available. It is here proposed that a series of magnetic head units record successive elements of an image on a magnetizable medium with linear timing of the activation of the head units to provide undistorted image print out. Where print out is to take place at a multiplicity of stations remote from a central computer, economy and simplicity of the image generating system is of the utmost importance. Accordingly, a rugged and reliable multichannel magnetic recording head of the stationary type represents an ideal component for such a system. Such a head requires a minimum of maintenance and its operation is reliable under varying temperature, humidity and other environmental conditions.

SUMMARY OF THE INVENTION

It is therefore an object of the present invention to provide an improved image printing system and method having a minimum of moving parts and a maximum simplicity.

Another object of the invention is to provide a simplified core switching system for sequentially activating a series of magnetic core units.

A further object of the invention is to provide an improved system and method for magnetic recording utilizing a stationary multichannel magnetic recording head wherein the head units are sequentially activated at substantially uniform time intervals.

Still another object of the invention is to provide a core switching system utilizing linearly graded windings and yet which enables a uniform cycling of the series of cores over a complete cycle of the excitation waveforms.

Another and further object is to provide a core switching system and method with switching of each core at a precisely determined instant of time.

In my prior application Ser. No. 515,507 filed Oct. 13, 1965 now U.S. Pat. No. 3,488,454 issued Jan. 6, 1970, and in the earlier related applications now U.S. Pats.

No. 3,382,325 and 3,382,326, both issued May 7, 1968, I have shown embodiments for achieving a linear switching interval between successive cores with the use of a linearly graded winding; however, the excitation waveform for the sweep winding in such embodiments has required an abrupt return from a maximum value to a zero value in each half cycle. Further the switching interval is distorted in each of the abrupt return portions so that there is not a uniform time interval between activation of each of the cores of the series. The embodiment specifically illustrated in the drawings herein overcomes this problem by utilizing a generally triangular substantially symmetrical waveform for the excitation current supplied to the sweep winding as will be more fully understood from the following detailed description.

DESCRIPTION OF THE PREFERRED EMBODIMENTS

Figures 1, 2:
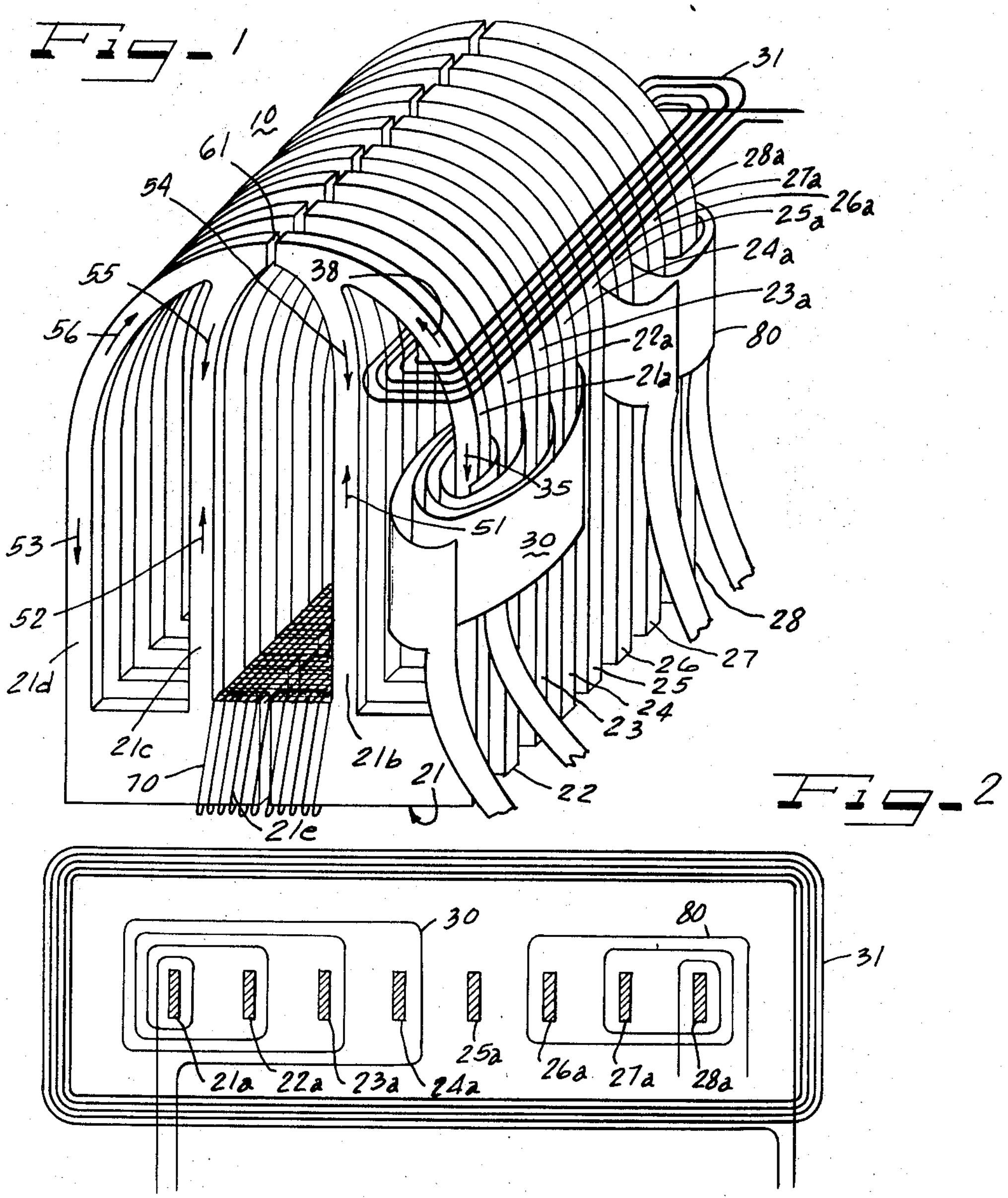
FIG. 1 is a diagrammatic perspective view illustrating the construction of a magnetic transducer head in accordance with the present invention.
FIG. 2 is a diagrammatic illustration of the arrangement of the excitation windings for two groups of head units of the type shown in FIG. 1.
Figure 3A:
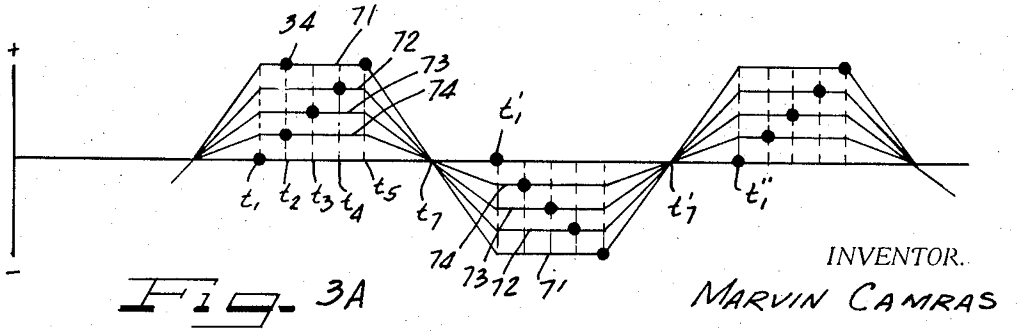
FIG. 3A is a waveform diagram showing the respective magnetomotive forces supplied by the graded winding to the respective head units of one group in FIG. 2.
Figure 3B:
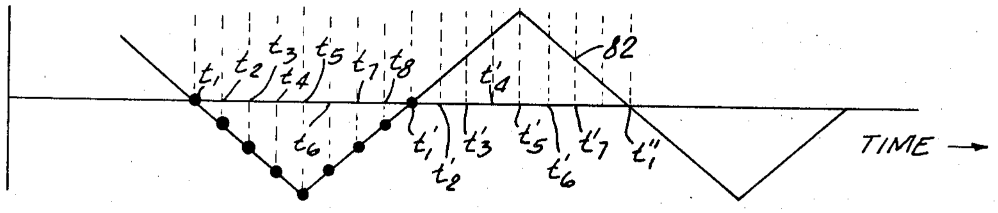
FIG. 3B is a waveform diagram on the same time scale as FIG. 3A and showing the magnetomotive force applied to each of the head units of FIG. 2 by means of the sweep winding.
Figure 4:
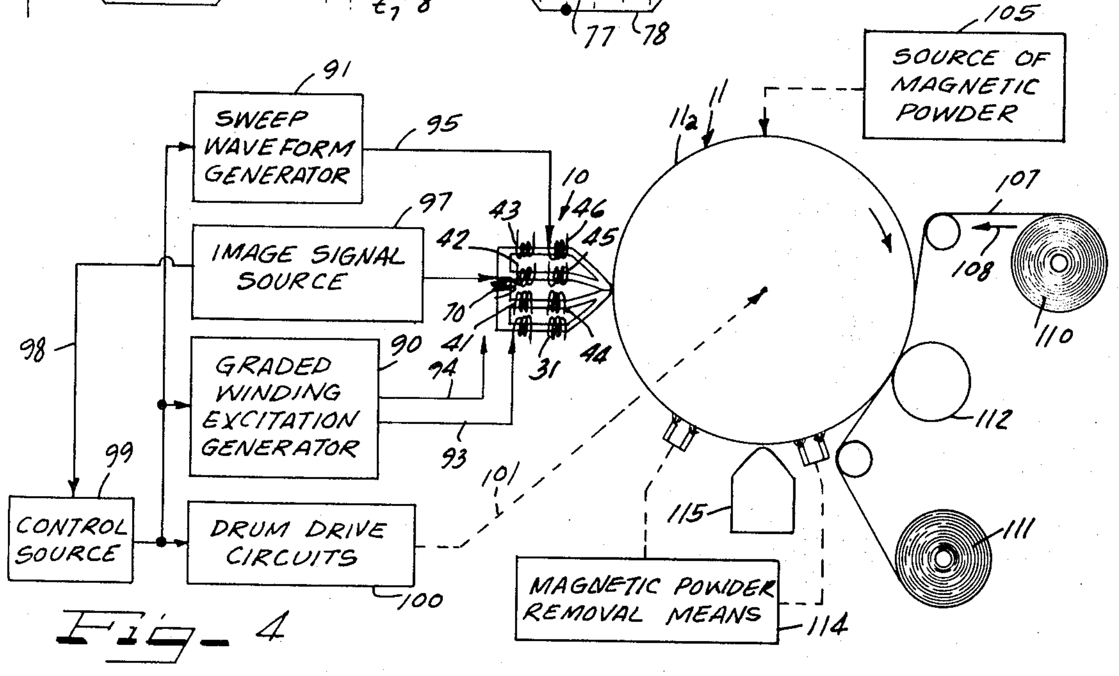
FIG. 4 is a diagrammatic illustration of an image printing system utilizing a head assembly in accordance with the preceding figures of drawing.

FIG. 1 illustrates a head assembly 10 for cooperation with respective channels of a magnetic record medium such as the magnetizable surface 11*a* of a drum 11 shown in FIG. 4. The head assembly 10 is made up of a series of head units including for purposes of diagrammatic illustration a first group of head units 21–24 and a second group of head units 25–28. Each of the head units comprises four legs of saturable magnetic material such as the legs 21*a*–21*d* of the head unit 21. Legs 21*a*–28*a* of the respective head units 21–28 are indicated in FIG. 1 and are shown in cross section in FIG. 2. The respective aligned legs such as 21*a*–28*a* have excitation windings thereon such as graded winding 30 and sweep winding 31 indicated in FIG. 1. The graded winding 30 is preferably of a ribbon configuration and is wound so as to link the legs 21*a*–24*a* with successively fewer numbers of turns as is best seen in FIG. 2. Sweep winding 31 links all of the legs 21*a*–28*a* with the same number of turns. At a given instant of time such as time $t_2$ represented in FIG. 3A, the graded winding 30 may receive current in a direction to establish a magnetomotive force such as represented by point 34 in FIG. 3A for core 21 and this magnetomotive force may be represented by arrow 35 in FIG. 1. At the same instant of time the sweep winding 31 may establish a magnetomotive force as represented by point 37 in FIG. 3B and as represented by arrow 38 in FIG. 1 opposing the magnetomotive force exerted on leg 21$a$ by the graded winding 30. At the instant of time $t_2$, the magnetomotive force exerted by the winding 30 greatly exceeds that exerted by the winding 31, so that legs 21$a$ and 21$b$ will be saturated in the clockwise direction as viewed in FIG. 1. As indicated diagrammatically in FIG. 4, legs 21$b$, 21$c$ and 21$d$ may be provided with graded windings 41–43 similar to the graded winding 31 and may be provided with sweep windings 44–46 similar to the sweep winding 31. At the instant of time $t_2$, windings 41–43 may exert magnetomotive forces in directions as represented by arrows 51–53 and windings 44–46 may exert magnetomotive forces as represented by arrows 54–56 in FIG. 1. The windings 30 and 41–43 may be connected in series and the windings 31 and 44–46 may be connected in series so that the magnetomotive force variations applied to each of the legs 21$a$–21$d$ may be essentially as represented in FIGS. 3A and 3B, but with the relative polarities as represented by the arrows in FIG. 1. Thus at the instant of time $t_2$, the magnetomotive forces represented by arrows 35, and 51–53 will predominate over the magnetomotive forces represented by arrows 38 and 54–56 so that there will be a saturating flux in the legs 21$a$, 21$b$ in the clockwise direction and there will be a local saturating flux in the legs 21$c$ and 21$d$ in the counterclockwise direction. The magnetomotive forces applied to the respective legs will be seen to be opposing with respect to the coupling gap 61 of head unit 21, and a similar condition will exist for the other head units.

A signal winding is indicated diagrammatically at 70 which links the base leg portions such as indicated at 21$e$ of all of the head units with the same number of turns. When the legs of a given head unit are saturated, the head unit is in a signal blocking condition and there is inadequate signal flux or other required recording flux at the coupling gap 61 to produce an effective recording on the magnetizable record medium such as surface 11$a$ of drum 11 in FIG. 4.

Figure 3C:
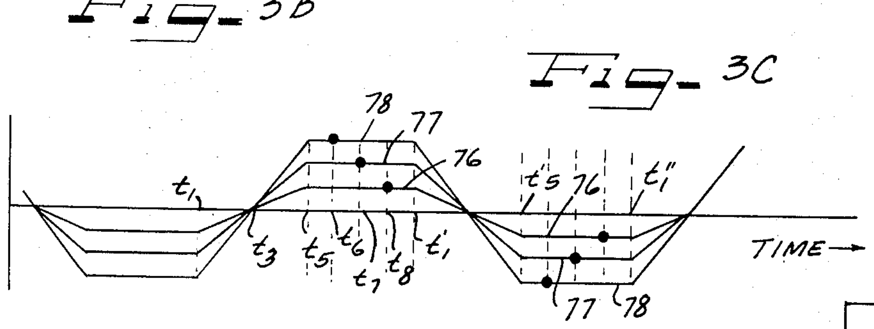
FIG. 3C is a waveform diagram similar to that of FIG. 3A but showing the magnetomotive forces applied to respective head units of the second group in FIG. 2.

Referring to FIGS. 3A and 3B, it will be observed that at time $t_1$ head unit 25 is being switched from one polarity of saturation to the opposite polarity of saturation, and accordingly this head unit is in a signal transmitting condition so as to effectively record an instantaneous value of signal on the associated channel of the record medium. At time $t_2$, head unit 24 is being switched from a positive polarity of saturation to a negative polarity of saturation as represented in FIGS. 3A and 3B while head unit 25 and the other head units are in a saturated or signal blocking condition. At times $t_3$, $t_4$ and $t_5$, head units 23, 22 and 21, respectively, are being switched from a positive polarity of saturation as represented in FIGS. 3A and 3B to a negative polarity of saturation, and at times $t_6$, $t_7$ and $t_8$, head units 28, 27 and 26 are switched from a negative polarity to a positive polarity of saturation as represented in FIGS. 3B and 3C. At time $t'_1$ the next half cycle begins with the switching of head unit 25 and a further half cycle takes place with the switching of head units 24, 23, 22, 21, 28, 27 and 26 at uniform intervals and in the sequence named just as in the previous half cycle. During the second half cycle, however, head units of the first group are switched from negative saturation to positive saturation as represented in FIGS. 3A and 3B while the head units 26, 27 and 28 of the second group are switched from positive saturation to negative saturation. At time $t''_1$, a new cycle begins with the switching of head unit 25 from positive to negative saturation once more.

It will be observed that in the example given in FIGS. 3A through 3C, the graded magnetomotive forces applied to the respective head units have a generally rectangular or substantially trapezoidal configuration, that is the three segments of the waveform in each half cycle together with the base line define a trapezoid. In the illustrated arrangement, the sloping segments of each half cycle of the waveform occupy one-eighth of a cycle each while the constant amplitude segments occupy one-fourth cycle. Thus, depending on the scale of the waveform plot, the waveform has a generally rectangular appearance. Each half cycle of the sweep waveform of FIG. 3B has a substantially triangular configuration and the positively and negatively sloping segments of each half cycle are of equal extent so that the triangular waveform is substantially symmetrical. It will be observed that with these waveform configurations, the interval between successive switching times such as $t_1$, $t_2$, $t_3$ . . . $t_8$ are all substantially equal and that the interval between $t_8$ and $t'_1$ and between all of the successive switching times are equal.

In FIG. 3A waveform curve 71 represents the component due to the graded windings such as 30 of the magnetomotive force variation as a function of time in legs 21$a$ through 21$d$, while waveforms 72 through 74 similarly represent the graded winding component of the magnetomotive force variation in the corresponding legs of head units 22, 23 and 24. The waveforms in FIG. 3C representing the graded winding component of the magnetomotive force variation in the legs of head units 26–28 have been designated by the reference numerals 76, 77 and 78, respectively. The curves 76–78 are produced by graded windings such as graded winding 80 linking the head unit legs 26$a$–28$a$ as indicated in FIG. 2. The leg 25$a$ of head unit 25 is not linked by the graded windings so that the only magnetomotive force supplied to this leg is that of the sweep winding 31. The head unit 25 is thus switched at the times that the sweep waveform 82 crosses the zero axis in FIG. 3B, i.e. at times $t_1$, $t'_1$, $t''_1$, etc.

Referring to FIG 4, an image printing system is illustrated wherein the head 10 receives graded winding excitation current from a component 90 and sweep waveform current from a component 91. Component 90 may supply current to windings 30, 41, 42 and 43 in series as indicated diagrammatically by line 93 and may supply a further excitation current via line 94 to graded windings such as 80 of the respective legs of head units such as 26–28 in series. The current waveforms and phase are such as to produce the magnetomotive waveforms indicated in FIGS. 3A and 3C in the respective legs. Similarly as indicated by line 95, component 91 may supply sweep current to windings 31, 44, 45 and 46 in series so as to produce the magnetomotive force waveform indicated in FIG. 3B in each of the legs of the successive head units. The common signal winding 70 is illustrated as receiving successive lines of an image signal from a source 97. By way of example, the image signal may be obtained by helically scanning a visual image without substantial retrace interval between the successive lines of the visual image. Where the successive gaps 61 of the head assembly 10 lie in a plane parallel to the axis of drum 11, the rate of rotation of the drum 11 may be coordinated with the pitch of the helical scanning of the visual image so that the lines of magnetization recorded across the magnetizable medium 11$a$ are essentially rectilinear with respect to the direction of movement of the record medium. By way of example, during helical scanning of a source visual image, the visual image may be scanned along successive substantially horizontal lines and the scanning device may generate a sync signal at the end of each horizontal scan which signal may be supplied as indicated by line 98 to a control source 99. The control source 99 may then initiate and control operation of the sweep waveform generator 91 and the graded winding excitation generator 90 to produce the magnetomotive force waveforms of FIGS. 3A–3C. Suitable phase shifting circuits may, of course, be associated with components 91, 90 and 99 so as to initially adjust the operation of the system. If desired, the drum drive circuits indicated at 100 may receive synchronizing pulses from control source 99 also. The mechanical coupling between the drum drive circuits 100 and the axis of drum 11 is indicated by the dash line 101.

In operation of the system, the image signal source 97 may supply successive horizontal lines of a visual image such as a printed page or a picture by typical facsimile techniques. Alternatively television type information at a frame rate of 30 frames per second, for example, may be supplied. As a third example, a visual image may be stored digitally by means of a digital computer memory and read out line by line to the head assembly 10 for recording on the drum 11. If the surace speed of the drum is 90 inches per second and the time for scanning of a line of the image information is 63 microseconds, for example, it will be seen that the movement of the surface of the drum will produce only a negligible slope of the recorded lines of the image on the recorded medium surface 11*a*.

As indicated in FIG. 4, the recorded magnetic image may be dusted with magnetic powder from a source 105 after which the magnetic powder may be transferred to a web 107 of paper or the like which may move in the direction of arrow 108 at a surface speed substantially identical to the surface speed of the drum 11. The web 107 may travel from a supply coil 110 to a take-up coil 111, and the powder may be suitably affixed to the paper web prior to coiling at 111. After transfer of the powder image to the web 107 by means of pressure roll 112 any excess powder may be removed from the drum by suitable means diagrammatically indicated at 114, and the magnetic medium 11*a* may be erased by means of an erase head diagrammatically indicated at 115.

Figures 5, 7:
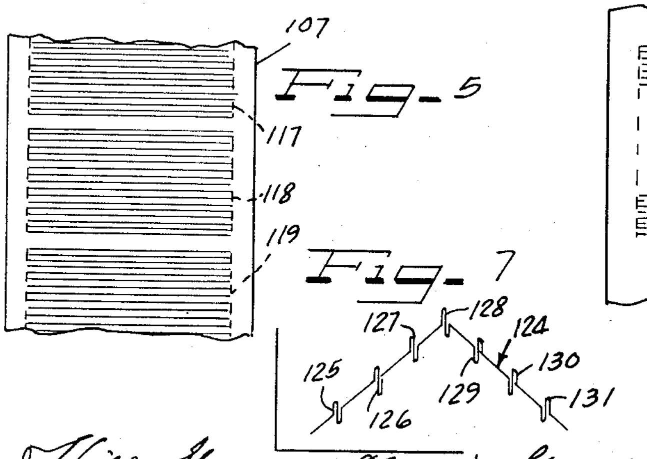
FIG. 5 is a diagrammatic illustration showing the printed output from the system of FIG. 4 under a first set of operated conditions.
FIG. 7 shows a special excitation waveform for use in place of the waveform of FIG. 3B for precise timing of the switching of individual core units in a core switching system and method such as illustrated in the preceding figures.

FIG. 5 illustrates one type of record format produced on a web such as indicated at 107 by the system of FIG. 4. In this embodiment web material 107 may contain successive image fields such as indicated at 117–119 each with a width of two inches and a length of 1.5 inches, for example (aspect ratio ¾). Each line may be recorded in an interval of 63 microseconds, and there may be 256 lines arranged successively along the length of the web for each field. A field such as field 118 may be recorded over an interval of 16.7 milliseconds corresponding to a rate of 60 fields per second and a surface speed of the drum or disk 11 of 90 inches per second. The system of FIG. 4 may print successive pictures at 117, 118, and 119, for example.

Figure 6:
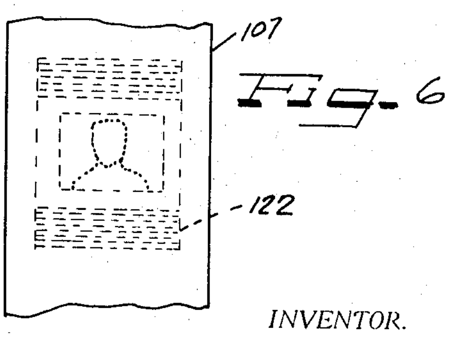
FIG. 6 is a diagrammatic view similar to FIG. 5 but showing the printed output from the system of FIG. 4 under a second set of operating conditions.

FIG. 6 represents a second type of record format on the web 107 of FIG. 4. This embodiment may be termed a page printer. Thus a page of information may occupy a region such as indicated at 122 on the web 107, the region 122 having a width of 8 inches and a length dimension of 10 inches. Each line of the region 122 may be recarded during an interval of 63 microseconds, and the region 122 may correspond to 256 lines on the drum 11 recorded over an interval of 16.7 milliseconds.

As a third example, the head 10 may be operated to scan a line on the web 107 over an interval of 630 microseconds and so as to record a page 10 inches long during an interval of 167 milliseconds. In this case 6 pages would be recorded per second, and the surface speed of the drum 11*a* and of the web 107 would be 60 inches per second. This compares with a surface speed of 600 inches per second for the embodiment of FIG. 6.

FIG. 7 represents a modified sweep waveform wherein there is superimposed on the waveform 82 of FIG. 3B successive pulse waveforms which serve to precisely determine the switching times of the successive cores. Thus, for example, the positive going portion of pulse 125 of waveform 124 in FIG. 7 may occur substantially at the time $t'_2$ indicated in FIG. 3B so as to precisely determine the time of switching of the head unit 24. Similarly pulse 126 may occur at time $t'_3$ and pulse 127 may occur at time $t'_4$. As indicated in FIG. 7, when the head units are being switched from positive to negative polarity, the corresponding pulses such as 129–131 in FIG. 7 have negative going portions occurring at times such as that corresponding to $t'_6$, $t'_7$ and $t'_8$ in FIG. 3B. The sweep waveform of FIG. 7 is useful where exceptionally precise timing is required for activation of each head unit. The pulse source for generating pulses such as indicated at 125–131 and superimposing the same on the sweep waveform would be incorporated within the generator 91, and FIG. 4 may be taken as specifically illustrating this arrangement as a second embodiment.

For symmetrical loading of the graded winding excitation circuits supplying conductors 93 and 94, the graded winding 80 may link an additional magnetic core unit so as to have the same configuration as the graded winding 30. It would not be convenient to have this core unit in scanning relation to the magnetizable record medium where the head unit would switch at time $t_5$, since head unit 21 switches at this time.

With respect to the embodiment of FIG. 4, it will be understood that the head assembly 10 may be angularly adjustable in a plane tangent to the surface 11*a* so that the line of gaps 61 may be tilted with respect to the direction of movement of the surface 11*a* rather than being at right angles thereto. The angle of such tilting of the head assembly 10 may be such that a straight line parallel to the axis of the drum 11 is generated on the magnetizable surface 11*a* during each scan of the successive head units of the heat assembly 10 (compensating for the drum motion during the time of one scan).

In order to fix the magnetic powder to the web 107, the magnetic powder from source 105 in FIG. 4 may be coated with thermoplastic material which is melted by a heated roller such as that indicated at 112. Alternatively, the web 107 may have its surface treated with a somewhat adhesive material which has an affinity for the magnetic powder on the magnetic surface 11*a*, the image transferred to the web 107 being set or fixed by heat or chemical action.

Referring to the embodiment of FIG. 7, the timing pulses such as indicated at 125–131 may be derived from the clock pulses of a computer providing the image signal source 97. The clock pulses from the computer may be supplied via line 98 so as to lock the scanning of the head assembly 10 into synchronism with a "master clock." It has been noted that as each core changes its direction of magnetization a voltage pulse is induced in the sweep (and graded) windings. These pulses can be used to lock the associated apparatus to the core switching sequence.

For the examples given herein there may be about 256 head units in the head assembly 10. These head units may be linked by common sweep windings and may include a central head unit which is not linked by the graded windings, and may otherwise be analogous to the simplified example of FIGS. 1, 2, and 3A–3C.

With the system of FIG. 4, multiple copies of a given recorded image signal may be made by deenergizing erase head 115 and recording head 10. The paper supply system may operate intermittently when the same magnetic image is producing multiple copies to prevent wastage of paper.

It will be apparent that many modifications and variations may be effected without departing from the scope of the novel concepts of this invention.

I claim as my invention:

1. An image printing system comprising:

a series of magnetic transducer head units for coupling with adjacent channels across a width dimension of a magnetizable medium and having respective cores including saturable magnetic material controlling a transducing operation with respect to said record medium, means comprising a substantially linearly graded winding having respective numbers of turns differing by successive substantially equal increments coupled to the cores of the successive transducer head units for sequentially and cyclically switching the saturable magnetic material thereof to cause the series of head units to cyclically scan the width dimension of the magnetizable medium, means for supplying a video signal to said head units having a line repetition rate corresponding to the rate of scanning of the width dimension of the magnetizable medium by said series of head units, and means for coacting with the magnetizable medium for automatically producing a visible copy of the video signal recorded thereon by said series of head units.

2. A system accordng to claim 1 with means for applying an alternating current of a generally rectangular waveform to said substantially linearly graded winding for providing substantially linearly related first alternating magnetomotive forces in the respective cores, and means for applying a substantially symmetrical generally triangularly shaped magnetomotive force waveform to each of said magnetic cores which is of a phase relative to the respective first magnetomotive forces to sequentially switch the saturable magnetic material of the respective cores at substantially uniform time intervals.

3. In an information processing apparatus, magnetic core units including respective variable permeability core portions of controllable permeability for switching between a signal blocking condition and a signal transmitting condition, and for coupling with respective regions of permanently magnetizable material, the respective core units each having a signal flux transducer element and a signal flux transmission path for effectively transmitting signal flux between the corresponding region of permanently magnetizable material and the transducer element only in the signal transmitting condition of the associated variable permeability core portion, first magnetomotive force applying means coupled to the respective variable permeability core portions of the respective core units for applying thereto respective different substantially linearly graded values of magnetomotive force, and second magnetomotive force applying means coupled to the variable permeability core portions of the respective core units for applying substantially equal magnetomotive forces thereto, the relative waveforms of the magnetomotive forces produced by the first and second magnetomotive force applying means in the respective core units being such as to sequentially switch the variable permeability core portions of the respective core units to signal transmitting condition and to activate the signal flux transmission paths of the core units at substantially uniform time intervals, a movable element having said permanently magnetizable material thereon, said core units each being disposed in coupling relation to one of a series of adjacent channels on the magnetizable material, means for supplying an image signal to the signal flux transducer element of each of the core units having a given line repetition rate, the sequential switching of the variable permeability core portions of the respective core units occurring cyclically at a repetition rate corresponding to the line repetition rate of the image signal to record a field of the image signal as a series of lines on the permanently magnetizable material, and means coacting with the recorded image field on the magnetizable material for producing at least one visible copy thereof.

4. The apparatus of claim 3 with means for rotating said element to move said magnetizable material past said magnetic core units at a speed correlated with the line repetition rate of the image signal to record a field of the image signal on the magnetizable surface with a predetermined aspect ratio.

References Cited

UNITED STATES PATENTS

| | | | |
|---|---|---|---|
| 2,291,476 | 7/1942 | Kernkamp | 346—74 |
| 3,161,544 | 12/1964 | Berry | 346—74 |
| 3,382,325 | 5/1968 | Camras | 179—100.2 |

J. RUSSELL GOUDEAU, Primary Examiner

U.S. Cl. X.R.

179—100.2